(12) United States Patent
Smith et al.

(10) Patent No.: US 7,278,693 B2
(45) Date of Patent: Oct. 9, 2007

(54) COUPLING ASSEMBLY

(75) Inventors: David Scott Smith, Avon Lake, OH (US); Carl M. Barr, Avon, OH (US)

(73) Assignee: The Scott Fetzer Company, Westlake, OH (US)

( * ) Notice: Subject to any disclaimer, the term of this patent is extended or adjusted under 35 U.S.C. 154(b) by 119 days.

(21) Appl. No.: 11/194,981

(22) Filed: Aug. 2, 2005

(65) Prior Publication Data

US 2007/0029870 A1    Feb. 8, 2007

(51) Int. Cl.
*B60B 23/08* (2006.01)
(52) U.S. Cl. .............. 301/113; 301/111.01; 301/111.03
(58) Field of Classification Search ........... 301/111.01, 301/111.03, 112, 113, 119, 120, 121, 122, 301/111.04; 403/155, 315, 326
See application file for complete search history.

(56) References Cited

U.S. PATENT DOCUMENTS

| | | | |
|---|---|---|---|
| 639,337 A * | 12/1899 | Anthony | 403/155 |
| 895,842 A * | 8/1908 | Chambers, Jr. | 411/213 |
| 1,882,625 A | 10/1932 | Jacobi | |
| 2,226,098 A * | 12/1940 | Hedstrom | 301/111.01 |
| 2,615,759 A * | 10/1952 | Becker | 301/112 |
| 3,468,568 A | 9/1969 | Ulich | |
| 3,477,309 A | 11/1969 | Sprecher | |
| 3,534,988 A | 10/1970 | Lindsey | |
| 3,791,096 A * | 2/1974 | Epperlein | 403/315 |
| 3,826,024 A * | 7/1974 | Petersen | 37/458 |
| 4,106,311 A | 8/1978 | Euler | |
| 4,505,058 A | 3/1985 | Peterson | |
| 4,765,646 A * | 8/1988 | Cheng | 280/651 |
| 5,131,785 A | 7/1992 | Shimazaki | |
| 5,347,882 A | 9/1994 | Klotz | |
| 5,518,332 A | 5/1996 | Katoh | |
| 5,716,107 A * | 2/1998 | Parker et al. | 301/111.07 |
| 6,067,825 A | 5/2000 | Galgovich et al. | |
| 6,561,593 B2 * | 5/2003 | Godwin | 301/111.04 |
| 6,808,186 B1 * | 10/2004 | Su | 280/47.26 |
| 6,955,512 B2 * | 10/2005 | Allen et al. | 411/353 |
| 2002/0192019 A1 | 12/2002 | Wack et al. | |
| 2003/0057010 A1 | 3/2003 | Harer et al. | |
| 2005/0179313 A1 * | 8/2005 | Liu | 301/111.01 |

* cited by examiner

*Primary Examiner*—Russell D. Stormer
(74) *Attorney, Agent, or Firm*—Jones Day

(57) ABSTRACT

A hub has an inner surface defining a bore centered on an axis, an outer surface surrounding the inner surface, and two slots extending in radially opposite directions from the bore to the outer surface. A shaft is configured to be received in the bore and has a circumferentially extending groove. A bent wire spring clip is configured to engage and mechanically interlock the hub and the shaft. The clip has a C-shaped section, two diametrically opposed bowed sections extending from opposite ends of the C-shaped section, and a two straight end sections respectively extending from ends of the two bowed sections to two distal ends of the clip. The clip is configured to have an installed position in which the bowed sections of the clip extend circumferentially in the groove at opposite sides of the shaft, and the end sections and the C-shaped section extend radially outward through the slots.

5 Claims, 11 Drawing Sheets

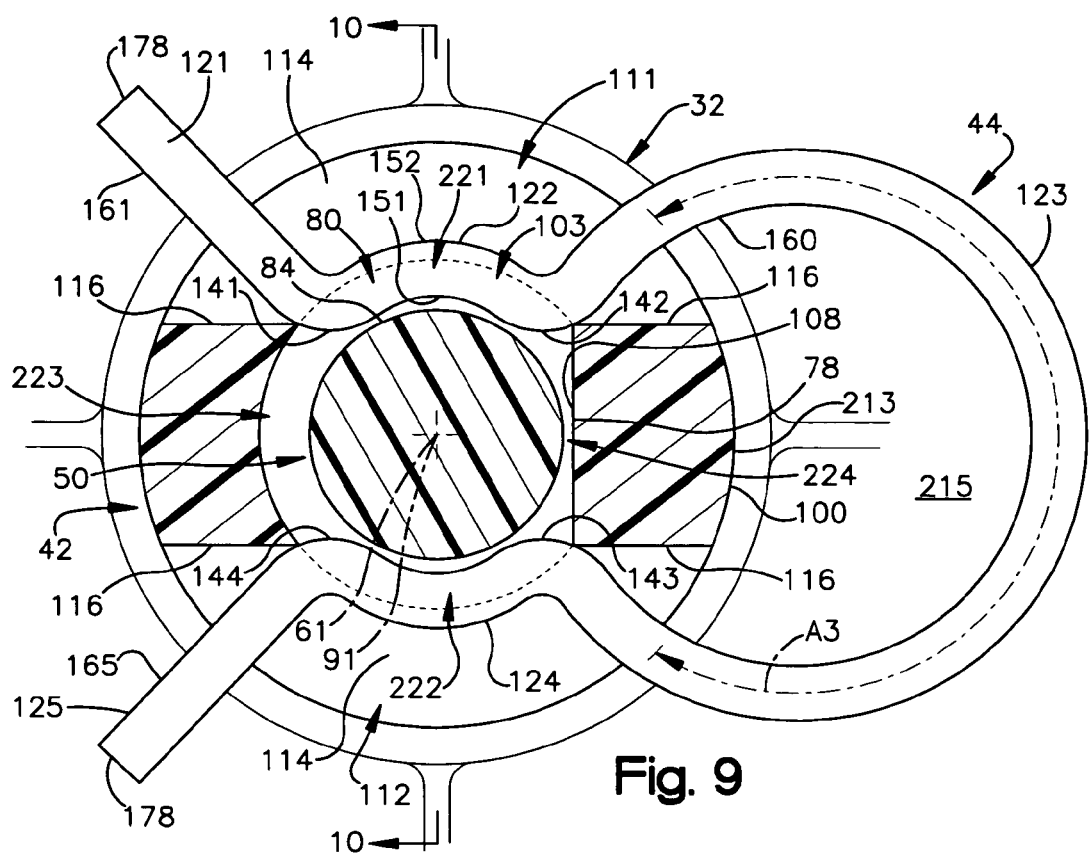
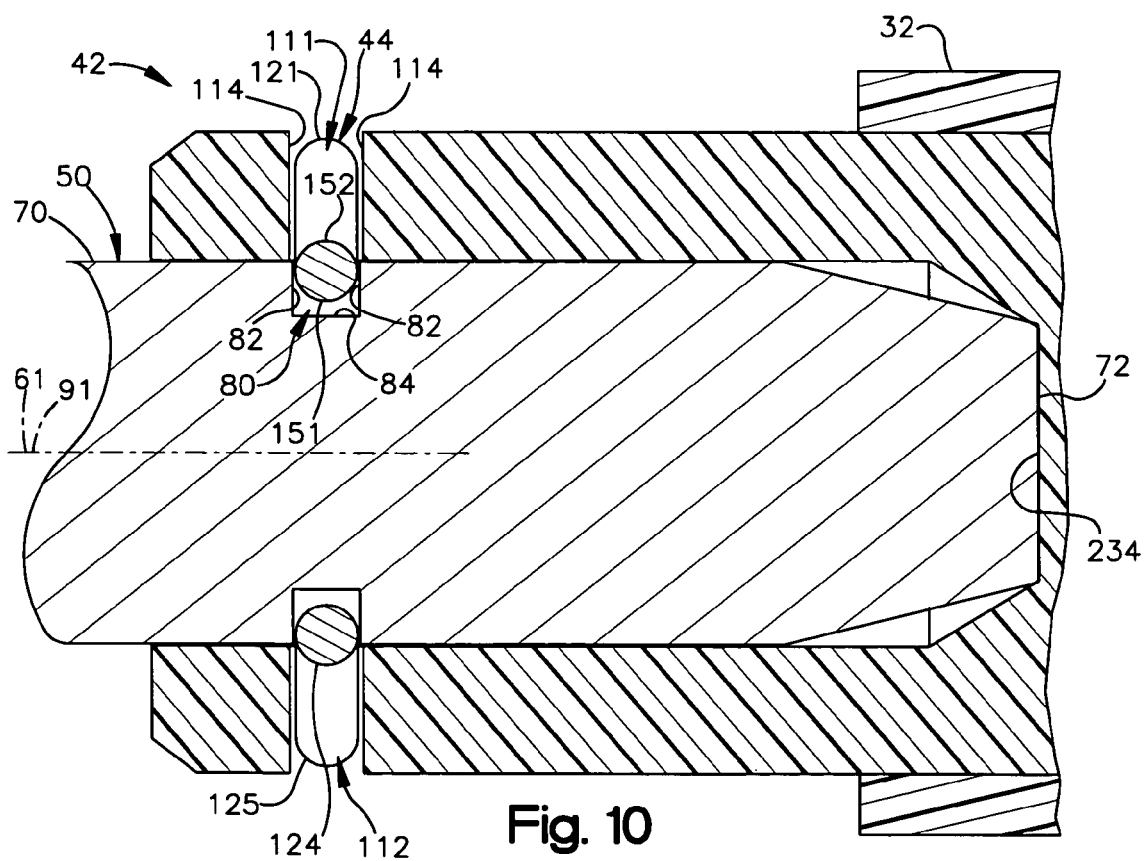

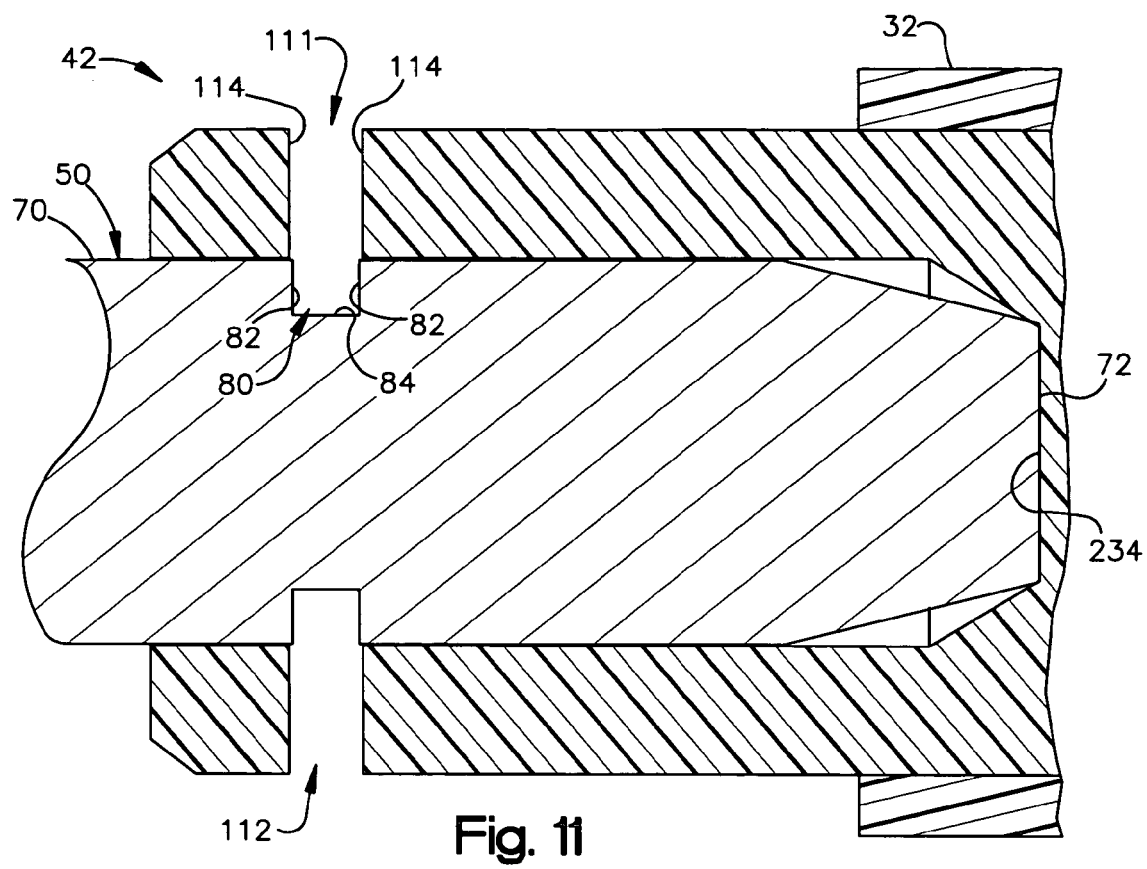
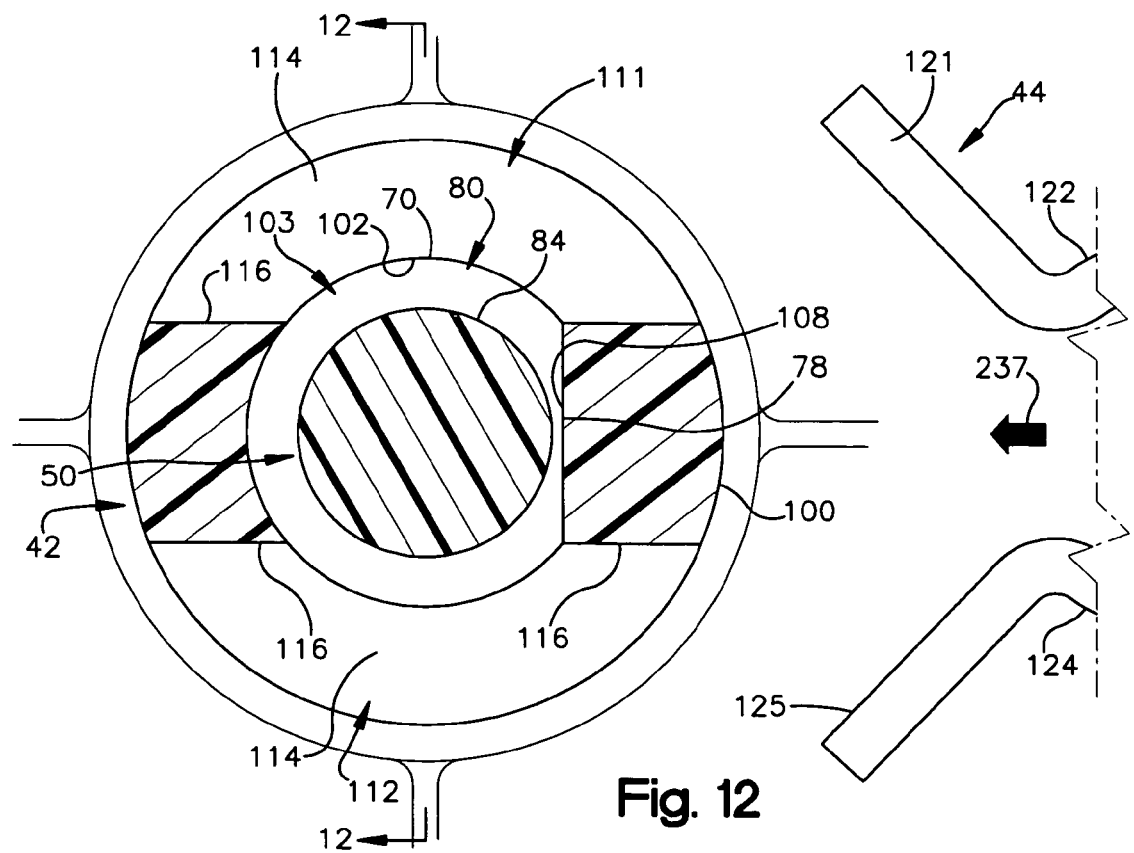

COUPLING ASSEMBLY

TECHNICAL FIELD

This technology relates to coupling assemblies, such as those for attaching a wheel to an axle.

BACKGROUND

A vacuum cleaner includes a base housing and front and rear wheels for wheeling the cleaner about a floor. The rear wheels are attached by a coupling assembly to a common rear axle that is rotatably connected to the housing.

SUMMARY

A hub has an inner surface defining a bore centered on an axis, an outer surface surrounding the inner surface, and two slots extending in radially opposite directions from the bore to the outer surface. A shaft is configured to be received in the bore and has a circumferentially extending groove. A bent wire spring clip is configured to engage and establish a mechanical interlock between the hub and the shaft. The clip has a C-shaped section, two diametrically opposed bowed sections extending from opposite ends of the C-shaped section, and a two straight end sections respectively extending from ends of the two bowed sections to two distal ends of the clip. The clip is configured to have an installed position in which the bowed sections of the clip extend circumferentially in the groove at opposite sides of the shaft and the end sections and the C-shaped section extend radially outward through the slots.

Preferably, the end sections and the C-shaped section extend radially outward through the slots along four imaginary lines that are spaced apart about the axis by angles of about 60° to about 120°.

BRIEF DESCRIPTION OF THE DRAWINGS

FIGS. 9-10 are sectional views of the assembly attached to the axle;

FIGS. 11-12 are sectional views illustrating a first method of detaching the wheel assembly from the axle;

DESCRIPTION

Apparatus

Figure 1:
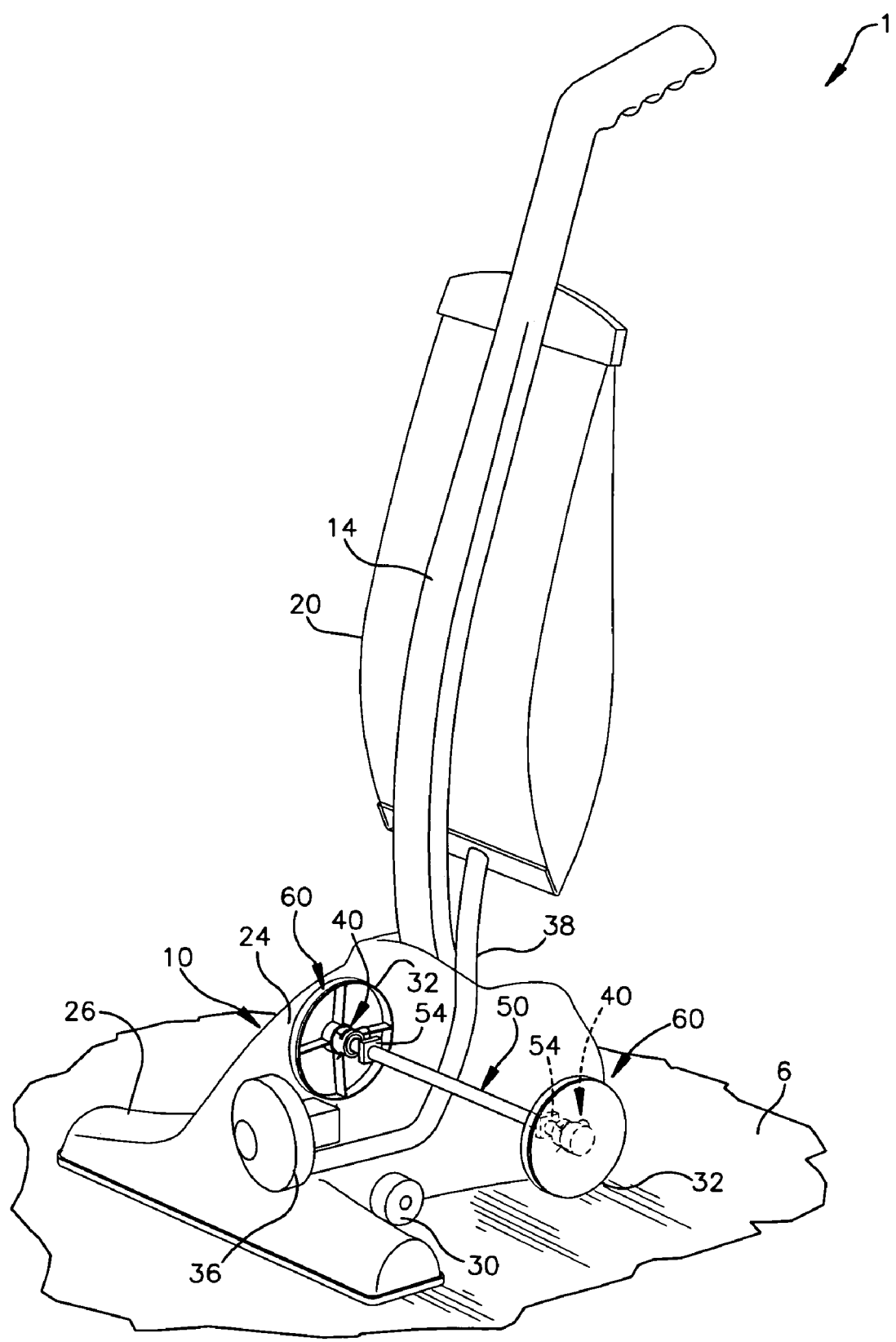
FIG. 1 is a perspective view of a vacuum cleaner including two rear wheel assemblies attached to an axle.

The apparatus 1 shown in FIG. 1 has parts that are examples of the elements recited in the claims. The apparatus 1 thus includes examples of how a person of ordinary skill in the art can make and use the claimed invention. It is described here to meet the requirements of enablement and best mode without imposing limitations that are not recited in the claims.

The apparatus 1 is a vacuum cleaner for cleaning a floor 6. It includes a base 10, a handle 14 extending upward from the base 10 and a filter bag 20 suspended from the handle 14. The base 10 includes a base housing 24 with a nozzle 26. Front and rear wheels 30 and 32 are rotatably connected to the housing 24 to enable wheeling the base 10 over the floor 6. A fan 36 in the housing 24 generates a flow of air that carries dirt from the floor 6, through the nozzle 26, the fan 36 and a fill tube 38 into the bag 20.

Each rear wheel 32 is removably attached by a coupling assembly 40 to a corresponding end of a shaft 50, in this case an axle. The axle 50 is rotatably connected to the housing 24 by bearings 54. The wheel 32 and the coupling assembly 40 together comprise a wheel assembly 60, one located at each end of the axle 50. The wheel assemblies 60 are identical. They are described as follows with reference to one of the wheel assemblies 60.

Figure 2:
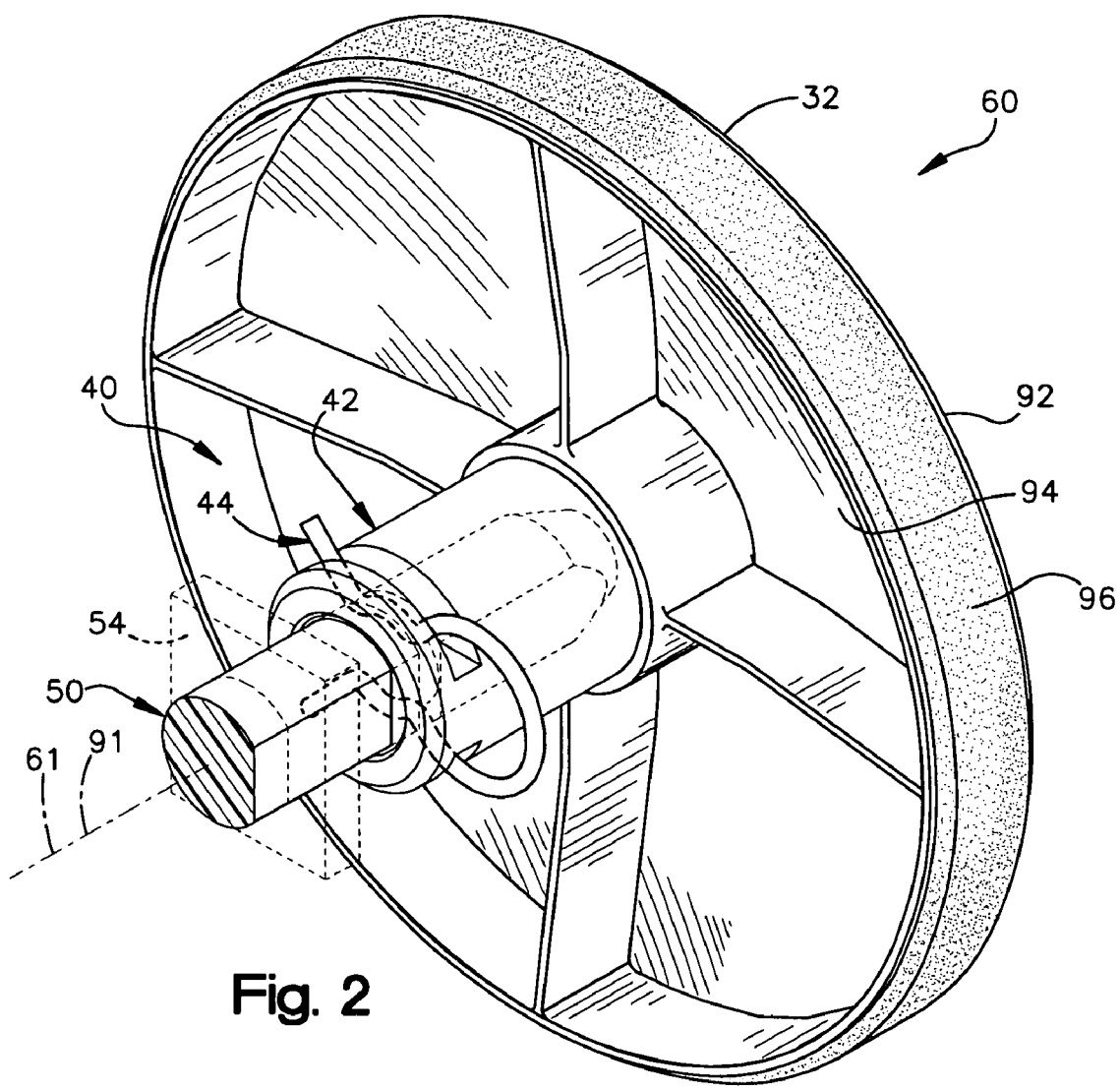
FIG. 2 is an expanded perspective view of one of the wheel assemblies.

As shown in FIG. 2, each coupling assembly 40 comprises a hub 42 and a clip 44 configured to attach the wheel 32 to the axle 50. The clip 44 is shown in an installed position, securing the hub 42 to the axle 50.

Figure 3:
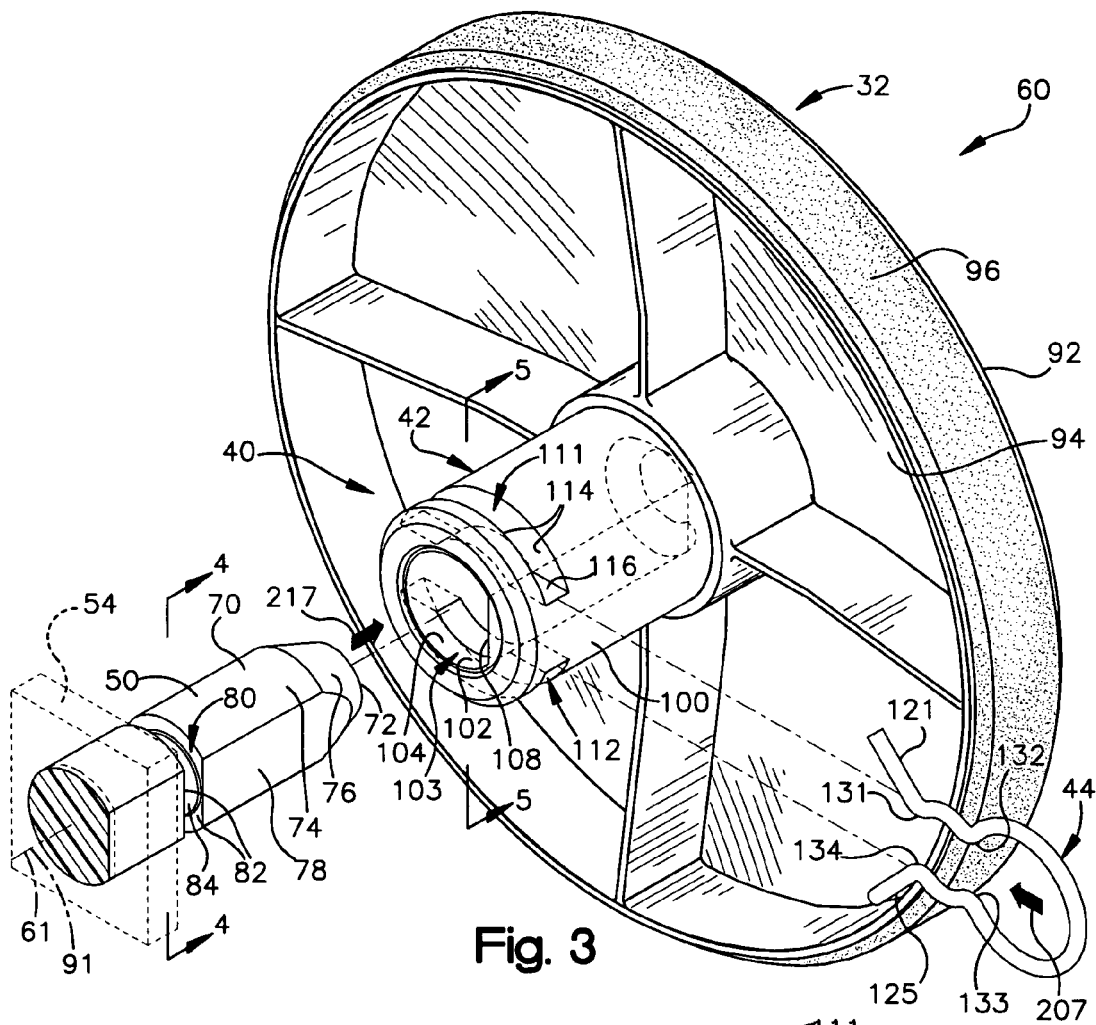
FIG. 3 is an exploded view of parts shown in FIG. 2.
Figure 4:
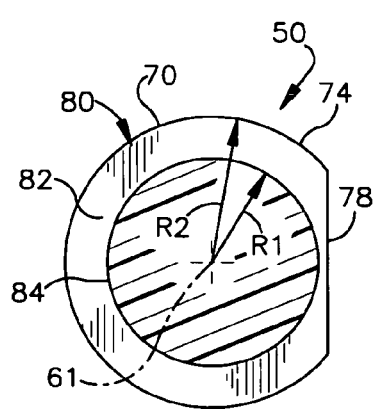
FIG. 4 is a sectional view of the axle, taken at line 4-4 of FIG. 3.

The axle 50 is shown in FIGS. 3-4. It is centered on an axis 61. It has an outer surface 70 with multiple sections. These include a front section 72, a cylindrical section 74 spaced rearwardly from the front section 72, a frustoconical beveled section 76 flaring outward from the front section 72 to the cylindrical section 74, and a flat section 78 interrupting the cylindrical section 64. A groove 80 extends circumferentially about the cylindrical surface 74 and across the flat section 78. The groove 80 is defined by two axially opposing side surfaces 82 and a radially inner surface 84. The radially inner surface 84 is round, with a radius R1 that is smaller than a radius R2 of the cylindrical section 74. The front, cylindrical and beveled surface sections 72, 74 and 76 and the groove 80 are centered on the axis 61.

The wheel 32 is shown in FIG. 3. It is centered on its axis of rotation 91, which coincides with the axis 61 of the axle 50 when the wheel 32 is attached to the axle 50. The wheel 32 has a flat axially outer surface 92, a ribbed axially inner surface 94, and a radially outer tread surface 96 centered on the axis 91.

Figure 5:
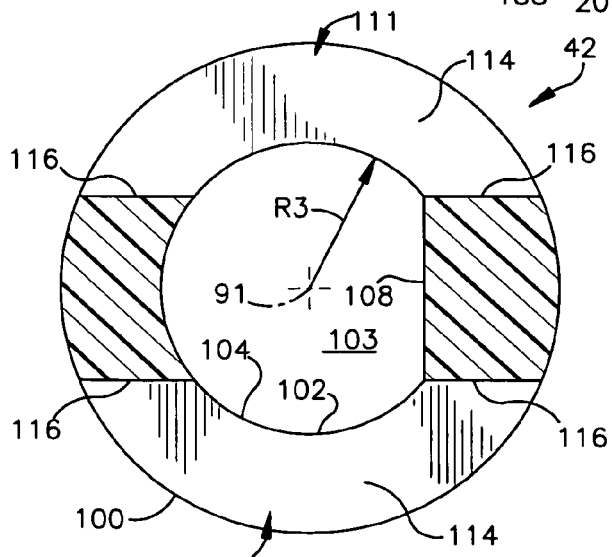
FIG. 5 is a sectional view of a hub of the wheel assembly, taken at line 5-5 of FIG. 3.

The hub 42 is shown in FIGS. 3 and 5. It is permanently fixed to, and extends axially inward from, the wheel 32. The hub 42 has a radially outer surface 100 surrounding a radially inner surface 102 that defines an axially extending bore 103. The inner surface 102 is configured to closely receive the axle 50. The inner surface 102 includes a cylindrical section 104 and a flat section 108 that are configured to respectively mate with the cylindrical and flat surface sections 74 and 78 of the axle 50. Accordingly, the cylindrical inner surface section 104 of the hub 42 has a radius R3 that equals or slightly exceeds the radius R2 (FIG. 4) of the cylindrical outer surface section 74 of the axle 50.

Upper and lower arcuate slots 111 and 112 extend in radially opposite directions perpendicular to the axis 91, from the bore 103 to the radially outer surface 100. The slots 111 and 112 are identical and located symmetrically opposite each other about the axis 91. Each slot 111 and 112 extends 180° circumferentially about the axis 91 and is defined by a pair of axially opposing parallel side surfaces 114 and a pair of circumferentially opposing coplanar end surfaces 116.

Figure 6:
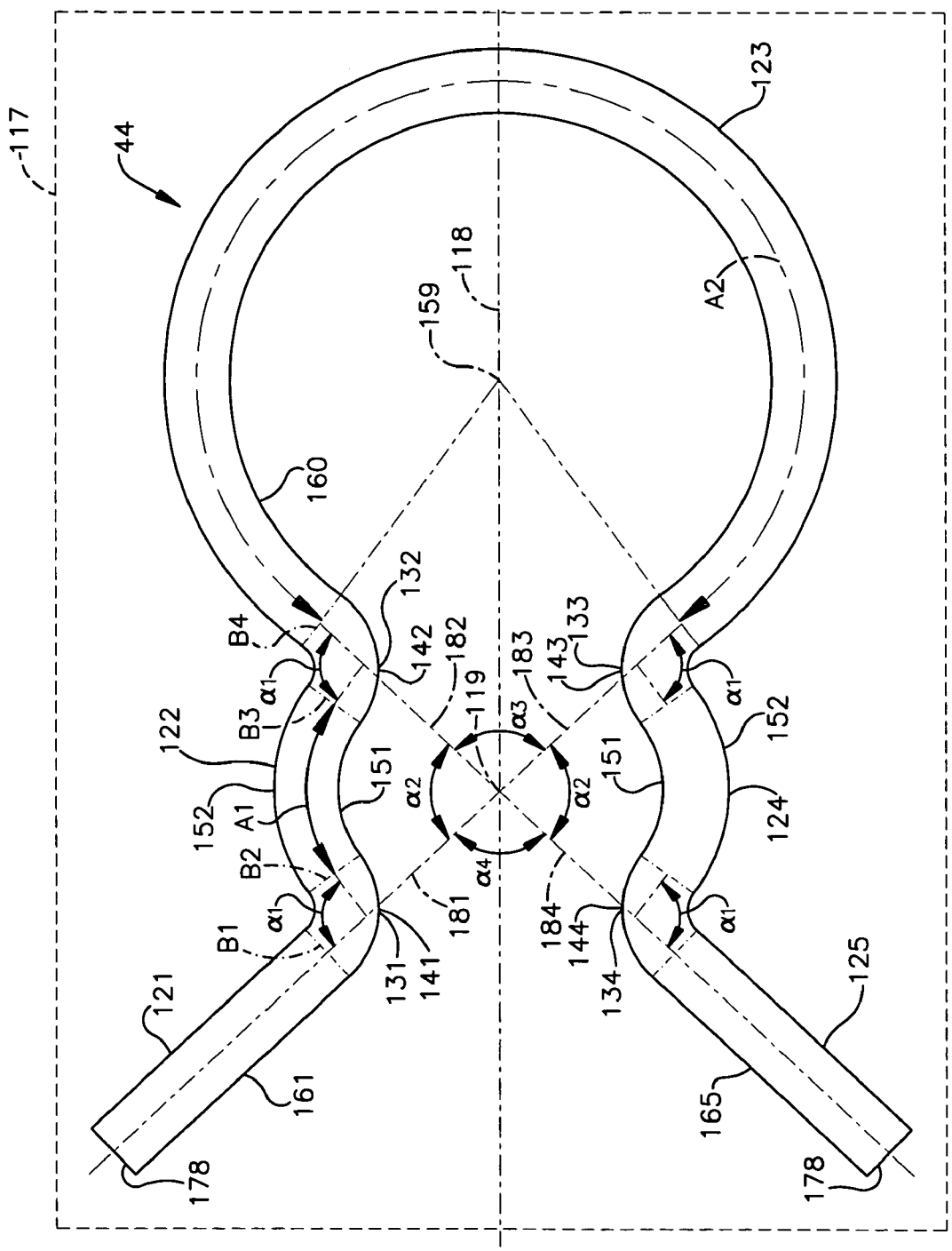
FIG. 6 is a sectional view of a clip of the wheel assembly.

The clip 44 is shown in FIG. 6. It is a spring clip formed of bent length of elastic metal wire with a cylindrical cross-sectional profile. The path followed by the wire is planar in that it is located on a single plane 117 along its entire length. The path is also symmetric about a line of symmetry 118 located on the plane 117. The shape of the clip 44 can be described as follows with reference to an imaginary reference point 119 about which the clip 44 extends. The reference point 119 is on the line of symmetry 118 and falls on the axes 61 and 91 (FIG. 3) when the coupling assembly 40 is attached to the axle 50.

The clip 44 has five sections 121, 122, 123, 124 and 125 disposed sequentially along the length of the clip 44. The first and fifth sections 121 and 125 are straight. The second, third and fourth sections 122, 123 and 124 are circular. The five sections are coplanar in that they lie on a common plane.

The first and second sections 121 and 122 meet at a first bend 131 in the clip 44, bounded by dashed boundary lines B1 and B2. The bend 131 is a radially outward bend with respect to the reference point 119. Similarly, the second and third sections 122 and 123 meet at a second radially outward bend 132 in the clip 44, bounded by dashed boundary lines B3 and B4. Likewise, the third and fourth sections 123 and 124 and the fourth and fifth sections 124 and 125 respectively meet at third and fourth radially outward bends 133 and 134 in the clip 44. Each bend 131, 132, 133 and 134 defines an angle α1 of more than 60°, less than 120°, about 60° to about 120°, and preferably of about 90°.

Each bend 131, 132, 133 and 134 is bounded by a respective convex edge 141, 142, 143 and 144, lying on the plane 117 and facing the reference point 119, that is preferably round. The radius of each convex edge 141, 142, 143 and 144 is smaller than the radially extending depth of the slot 111 and 112, and can even be zero to define a sharp right angle.

The second and fourth sections 122 and 124 are circumferential gripping sections in that they are configured to extend circumferentially within the axle groove 80 (FIG. 3) to grip and secure the axle 50. The gripping sections 122 and 124 are circularly bowed, diametrically opposed, symmetric about the reference point 119, and mirror images of each other with respect to the line of symmetry 118. Each gripping section 122 and 124 has, lying on the plane 117, a concave radially inner edge 151 and a convex radially outer edge 152. Each inner and outer edge 151 and 152 defines an arc A1 of more than 60°, less than 120°, about 60° to about 120°, and preferably of about 90°.

The third section 123 is a radial bridging section in that it extends radially outward from an end of each gripping section 122 and 124 to bridge from one gripping section 122 to the other 124. It is C-shaped and thus defines an arc A2 of more than 180°, centered on a reference point 159 on the line of symmetry 118. In this example, the arc A2 is more than 240°, and preferably more than 270°. Relative to other shapes, such as oval, the circular shape improves the spring bias retaining the gripping sections 122 and 124 in the axle groove 80. The bridging section 123 defines an inner edge 160 that lies on the plane 117 and extends from the second convex edge 142 to the third convex edge 143.

The radius of the inner edge 160 is greater than the radii of the inner edges 151 of the gripping sections 122 and 124. The diameter of the inner edge 160 is greater than the distance between the inner edges 151 of the gripping sections 122 and 124 as measured through the reference point 119, or through the axes 61 and 91 (FIG. 3) when the clip 44 is installed.

The first and fifth sections 121 and 125 are radial end sections in that they extend radially outward from ends of the gripping sections 122 and 124 to distal ends 178 of the clip 44. The end sections 121 and 125 have straight edges 161 and 165 that lie on the plane 117 and respectively extend radially outward from the first and fourth convex edges 141 and 144 to the distal ends 178.

In its installed position, the bridging and end sections 123, 121 and 125 extend radially outward through the slots 111 and 112 (FIG. 2) along four imaginary lines 181, 182, 183 and 184. The imaginary lines 181, 182, 183 and 184 meet in the axle 50 (FIG. 2) and preferably at or at least near the axis 61. They are sequentially spaced about the axis 61 by, and meet at, angles α2, α3 and α4 of more than 60°, less than 120°, about 60° to about 120°, and preferably of about 90°. The angles α3 and α4 are preferably approximately equal.

Procedure for Attaching the Hub to the Axle

A method for attaching the coupling assembly 40 to the axle 50 is illustrated in FIG. 3. First, the clip 44 is positioned beside the hub 42 such that its end sections 121 and 125 are directed toward respective slots 111 and 112. The clip 44 is moved toward the hub 42 as indicated by arrow 207. As the clip 44 is moved, the bends 131, 132, 133 and 134 of the clip 44 slide up the outer surface 100 of the hub 42 and over the end surfaces 116 until the gripping sections 122 and 124 drop into the slots 111 and 112. This brings the clip 44 into its installed position on the hub 42 as shown in FIG. 7.

Figure 7:
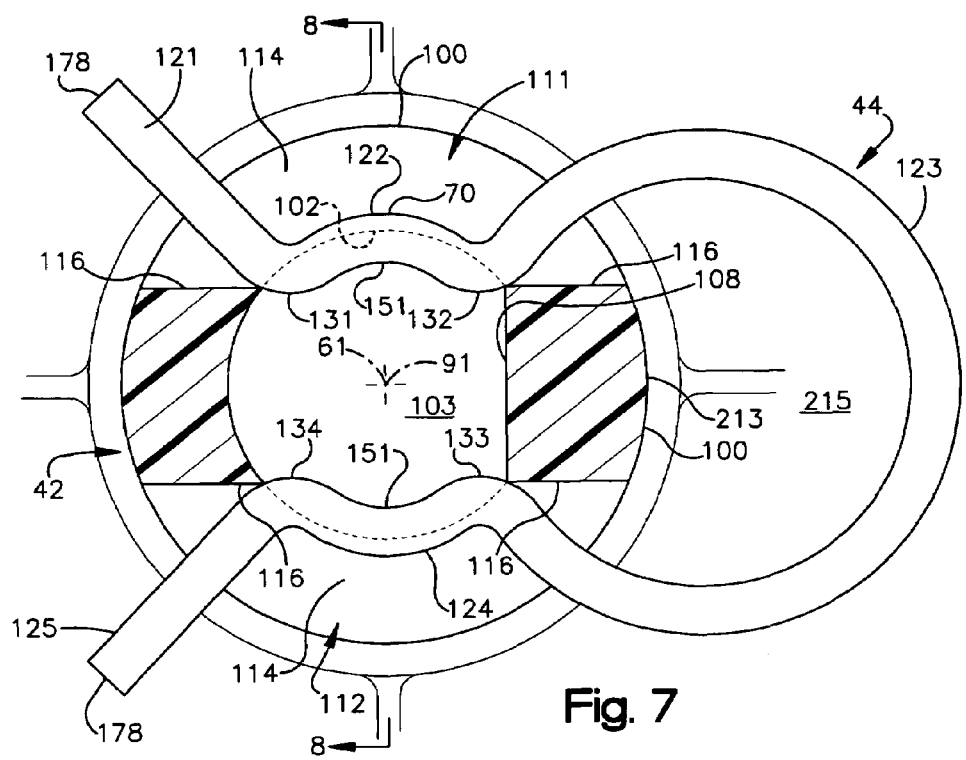
FIGS. 7-8 are sectional views illustrating a first method of attaching the wheel assembly to the axle.
Figure 8:
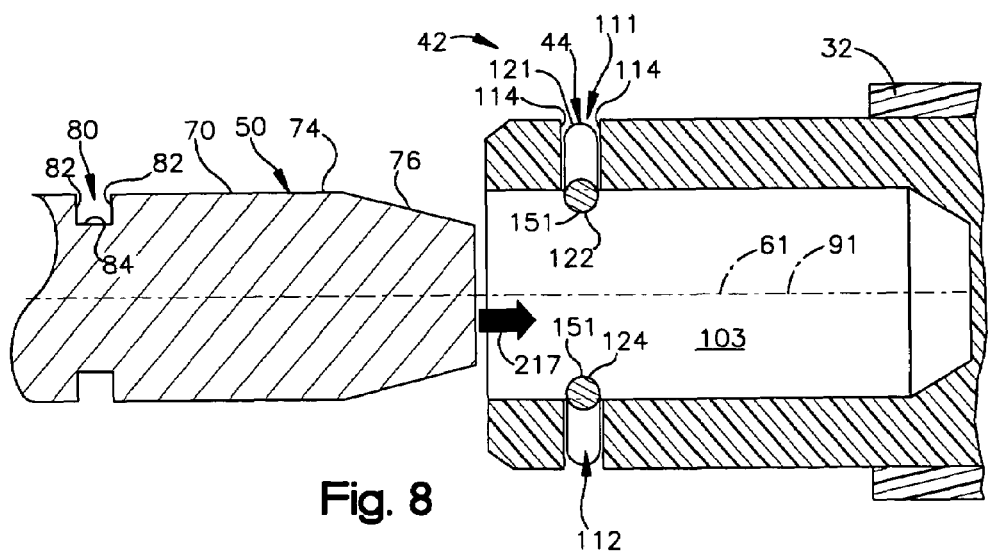

In the installed position of the clip 44 shown in FIG. 7, spring bias of the bridging section 123 of the clip 44 retains the arcuate inner edges 151 of the gripping sections 122 and 124 of the clip 44 in the bore 103. Transverse movement of the clip 44 relative to hub 42 is prevented by abutment of the bends 131, 132, 133 and 134 of the clip 44 against the end surfaces 116 of the slots 111 and 112. As shown in FIG. 8, axial movement of the clip 44 relative to the hub 42 is prevented by abutment of the sections 121, 122, 123, 124 and 125 of the clip 44 against the side surfaces 114 of the slots 111 and 112.

Next, the axle 50 is positioned in front of the hub 42, with its axis 61 coinciding with the axis 91 of the hub 42. The axle 50 is inserted into the bore 103 of the hub 42 as indicated by arrow 217. As the axle 50 is inserted, the arcuate inner edges 151 of the gripping sections 122 and 124 of the clip 44 slide up and over the beveled and cylindrical surface sections 76 and 74 of the axle 50 and drop into the groove 80. This brings the hub 42, and thus the wheel 32, into a removably installed position on the axle 50 as shown in FIGS. 9 and 10.

With the hub 42 thus attached to the axle 50, the following features are apparent: Spring bias of the bridging section 123 of the clip 44 retains the arcuate inner edges 151 of the gripping sections 122 and 124 in the axle groove 80. The arcuate inner edges 151 extend circumferentially through the groove 80, while the arcuate outer edges 152 of the gripping sections 122 and 124 extend circumferentially through the hub slots 111 and 112. At least a portion of each convex edge 141, 142, 143 and 144 is in the groove 80.

Contiguous edges 161, 141, 151, 142 and 160 described above together define a continuous edge that extends from one of the distal ends 178, radially inward through the first slot 111 into the groove 80, circumferentially through the groove 80, and radially outward from the groove 80 through and beyond the slot 111.

Axial movement of the axle 50 relative to the clip 44 is prevented by abutment of the gripping sections 122 and 124 of the clip 44 against the side surfaces 82 of the groove 80. Rotary movement of the axle 50 relative to the hub 42 is prevented by abutment of the flat section 78 of the axle 50 with the flat section 108 of the hub 42. The clip 44 thus engages and establishes a mechanical interlock between the hub 42 and the shaft 50.

The end sections 121 and 125 and the bridging section 123 extend radially outward from the gripping sections 122 and 124 through and beyond the slots 111 and 112 of the hub 42. The ends 178 of the clip 44 are located outside the hub 42.

The bridging section 123 extends arcuately about the hub 42 from the first slot 111 to the second slot 112. A central side location 213 on the outer surface 100 of the hub 42 is located circumferentially midway between the slots 111 and 112. The central side location 213 is spaced from and faces the bridging section 123. Accordingly, a space 215 exists between the hub 42 and the bridging section 123 at the central side location 213. A portion of the bridging section 123 that is outside the slots 111 and 112 and spaced from the hub 42 defines a circular arc A3 of more than 180°, preferably more than 210°, and more preferably more than 240°.

The groove 80 can be continuous or discontinuously segmented. In the example shown in FIG. 9, the groove 80 is continuous, because it comprises upper and lower portions 221 and 222 connected to each other by two opposite side portions 223 and 224. However, only the upper and lower portions 221 and 222 receive the clip 44. Since the side portions 223 and 224 are not needed, they can be omitted. In that case, the groove 80 would be discontinuous, because the upper and lower portions 221 and 222 would not be connected to each other by the side portions 223 and 224. But the upper and lower portions 221 and 222 would still be parts of "the groove 80".

Another method for attaching the coupling assembly 40 to the axle 50 is illustrated in FIGS. 11 and 12. First, as shown in FIG. 11, the axle 50 is inserted into the hub 42 until its front section 72 abuts an axially inner wall 234 of the hub 42. The axle 50 is configured for this to bring the axle groove 80 into axial alignment with the slots 111 and 112. Next, as indicated by arrow 237 in FIG. 12, the clip 44 is moved toward and into its installed position, shown in FIG. 13.

Procedure for Detaching the Hub from the Axle

Figure 13:
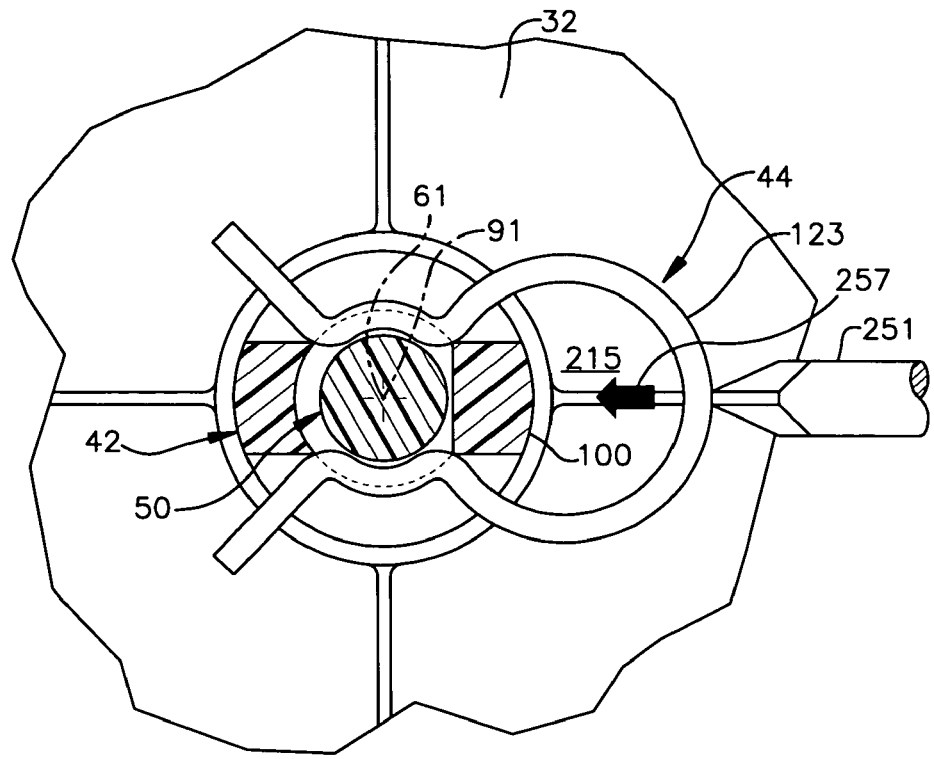
FIGS. 13-14 are sectional views illustrating a second method of detaching the wheel assembly from the axle.
Figure 14:
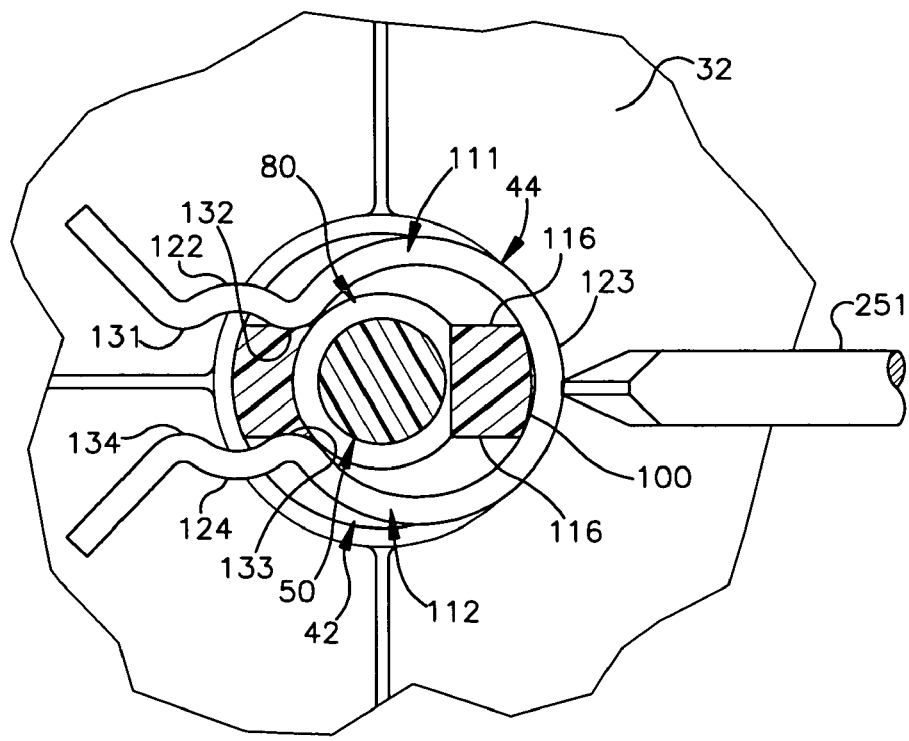

There are several possible methods for detaching the hub 42, and thus the wheel 32, from the axle 50. One method is illustrated in FIG. 13. The bridging section 123 is pushed toward the hub 42 with a screwdriver 251 in a transverse direction, indicated by arrow 257. The bridging section 123 is moved into abutment with the outer surface 100 of the hub 42 as shown in FIG. 14. This moves the first and fourth bends 131 and 134 out of the hub 42, moves the second and third bends 132 and 133 onto a pair of the end surfaces 116, and pulls the gripping sections 122 and 124 out of the axle groove 80. The axle 50 can then be withdrawn from the hub 42. As shown in FIG. 13, this procedure is enabled by the space 215 between the bridging section 123 and the hub 42 providing sufficient room for the bridging section 123 to move sufficiently far toward the hub 42 to bring the gripping sections 122 and 124 out of the axle groove 80.

Figure 15:
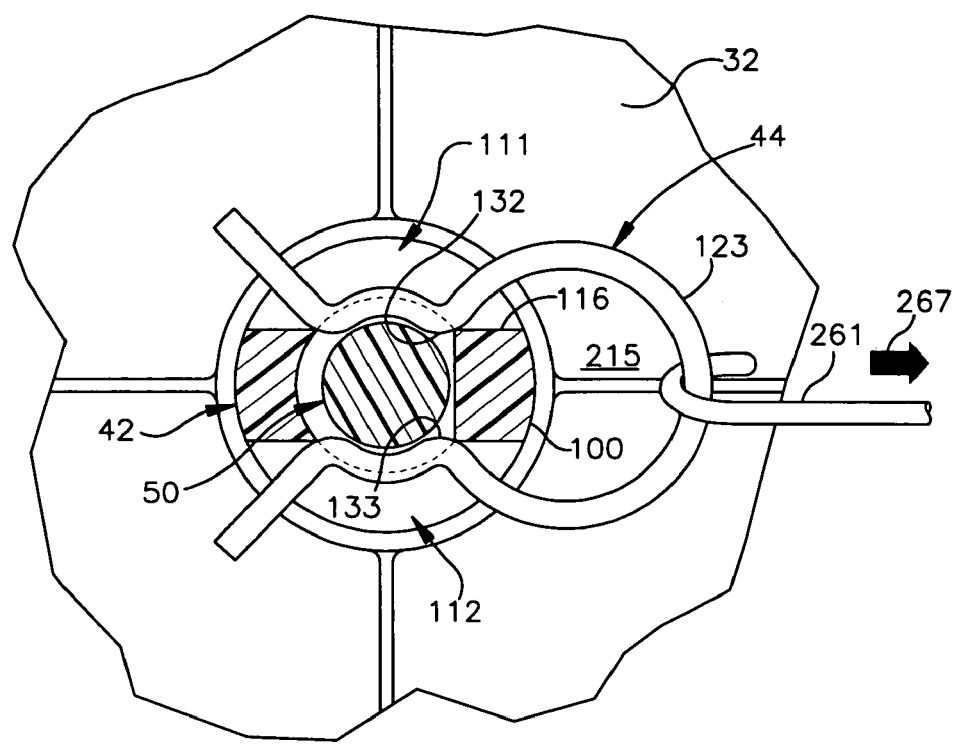
FIGS. 15-16 are sectional views illustrating a second method of detaching the wheel assembly from the axle.
Figure 16:
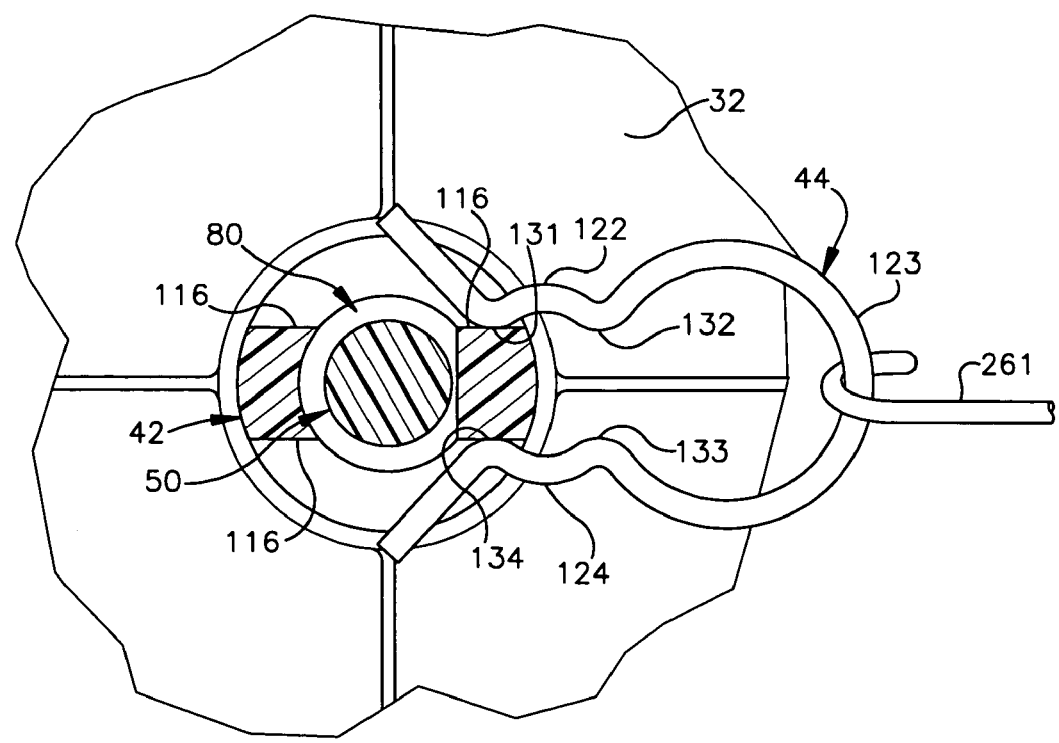

A second possible method for detaching the wheel 32 is illustrated in FIG. 15. A hook 261 is inserted in the space 215 between the bridging section 123 and the hub 42. The hook 261 pulls the bridging section 123 away from the hub 42 in a transverse direction indicated by arrow 267. This, as shown in FIG. 16, moves the second and third bends 132 and 133 of the clip 44 out of the hub 42, moves the first and fourth bends 131 and 134 onto a pair of the end surfaces 116, and pulls the gripping sections 122 and 124 out of the axle groove 80. The axle 50 can then be withdrawn from the hub 42. If desired, the hook 261 can pull the clip 44 completely off the hub 42.

The first and second methods described above thus enable the gripping sections 122 and 124 of the clip 44 to be pulled out of the groove 80 by moving the clip 44 in either of two radially opposite transverse directions 257 and 267 (in FIGS. 13 and 15, respectively).

Figure 17:
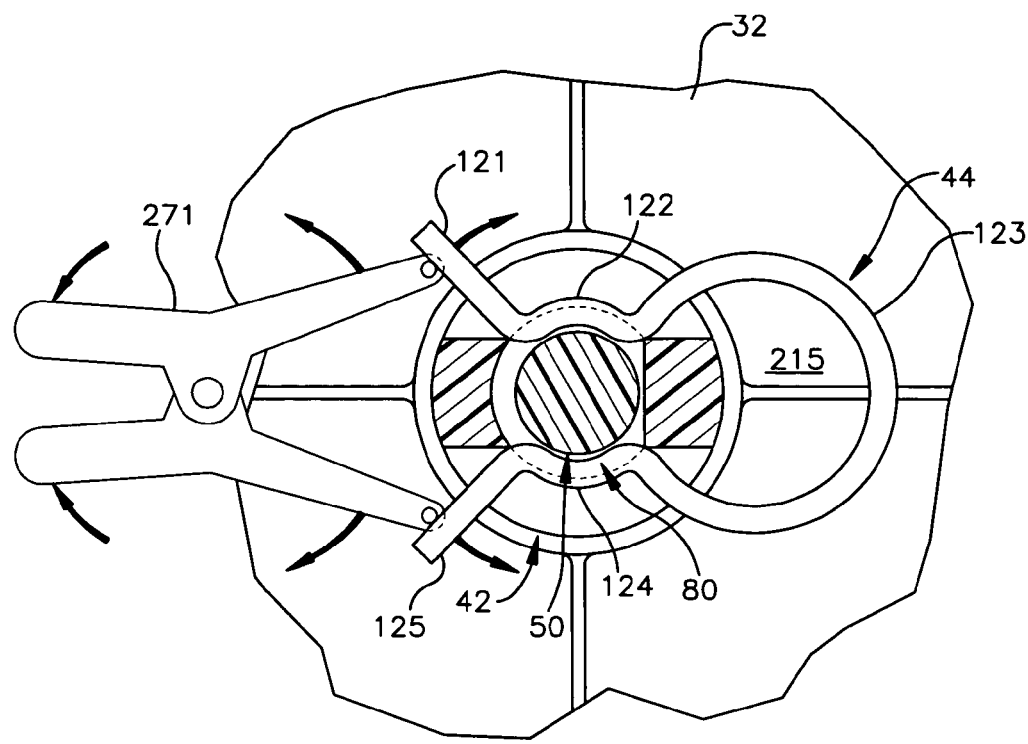
FIGS. 17-18 are sectional views illustrating a third method of detaching the wheel assembly from the axle.
Figure 18:
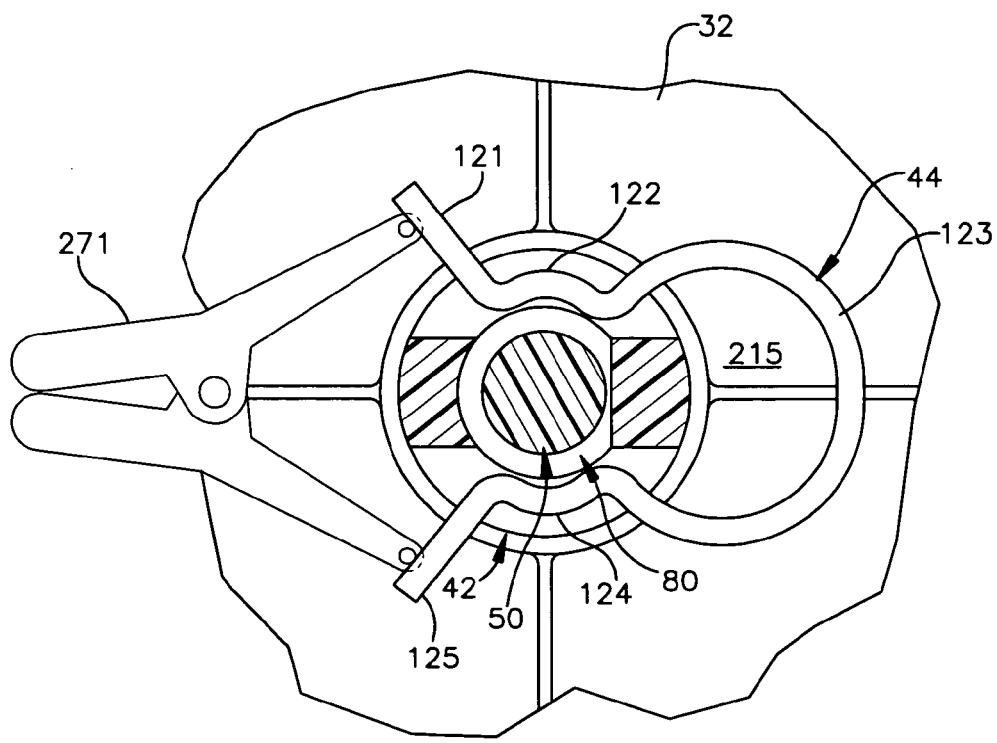

A third method of detaching the wheel 32 is illustrated in FIG. 17. A tool 271 engages the end sections 121 and 125 of the clip 44 where they protrude from the hub 42 and pries them apart against bias of the bridging section 123. This spreads the bridging section 123 open, pulling the gripping sections 122 and 124 out of the axle groove 80, as shown in FIG. 18. The axle 50 can then be withdrawn from the hub 42. When the tool 271 releases the clip 44, the clip 44 will automatically snap back into its installed position. This is in contrast to the first and second methods described above, which require the clip 44 to be manually pushed transversely back into its installed position.

Figure 19:
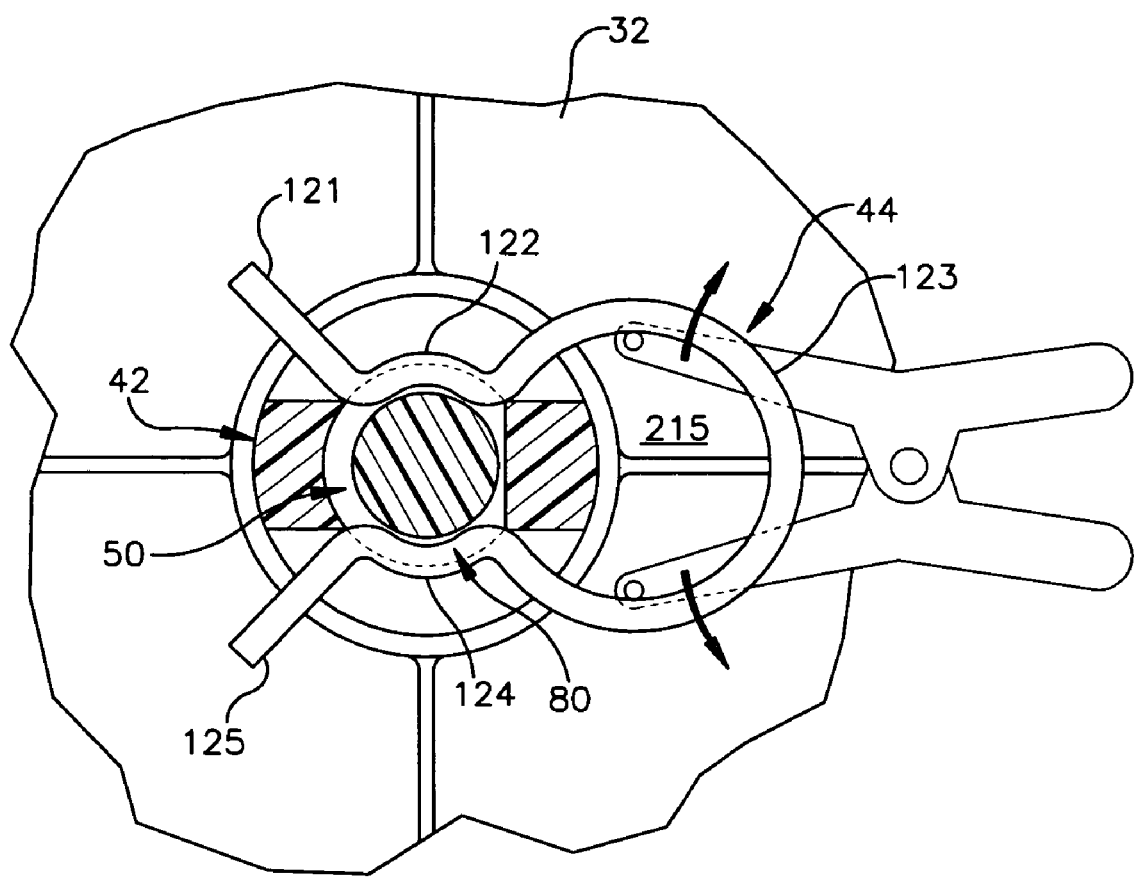
FIG. 19 is a sectional view illustrating a fourth method of detaching the wheel assembly from the axle.

A fourth method of detaching the wheel 32 is illustrated in FIG. 19. The tool 271 is inserted into the space 215 bordered by the hub 42 and the bridging section 123. The tool 271 engages opposite locations of the bridging section 123 to spread it open. This pulls the gripping sections 122 and 124 out of the axle groove 80, enabling the axle 50 to be withdrawn from the hub 42.

The coupling assembly 40 (FIG. 2), comprising the hub 42 and clip 44, is well suited for coupling a wheel 32 to an axle 50, as described above. However, the coupling assembly 40 can also be used to couple other devices together, such as to couple a crank to a shaft that is not an axle.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. An apparatus comprising:
   a hub having an inner surface defining a bore centered on an axis, an outer surface surrounding the inner surface, a slot extending from the bore to the outer surface, and first and second circumferentially opposed end surfaces bordering the slot;
   a shaft configured to be received in the bore and having a groove; and
   a clip configured to be attached to the hub in an installed position in which the clip extends from within the groove outward through the slot to secure the hub to the shaft, and to be withdrawn from the groove to release the hub from the shaft by sliding the clip onto the first end surface as the clip is moved in a linear first transverse direction, and by sliding the clip onto the second end surface as the clip is moved in an opposite second transverse direction.

2. The apparatus of claim 1 wherein the end surfaces are coplanar.

3. An apparatus comprising:
   a hub having an inner surface defining a bore, an outer surface surrounding the inner surface, and two slots extending in radially opposite directions from the bore to the outer surface;

a shaft configured to be received in the bore and having a groove; and a clip configured to be attached to the hub in an installed position in which the clip extends through both slots into the groove to secure the hub to the shaft and defines a space between the hub and the clip circumferentially midway between the slots and enables a hook to be inserted in the space to pull the clip transversely off of the hub;

wherein the clip can be withdrawn from the groove to release the shaft by moving the clip in either of two transversely opposite directions.

4. An apparatus comprising:

a hub having an inner surface defining a bore, an outer surface surrounding the inner surface, and first and second slots extending in radially opposite directions from the bore to the outer surface;

a shaft centered on an axis configured to be received in the bore and having a groove; and a clip configured to be attached to the hub in an installed position in which first and second portions of the clip extend from within the groove outward through the first and second slots to secure the hub to the shaft, and a third portion of the huh clip extends from the first portion about the hub to the second portion along a circular arc of more than 180° that is spaced from the hub;

wherein the third portion can be moved transversely toward the hub to withdraw the first and second portions from the groove to release the hub from the shaft.

5. The apparatus of claim 4 wherein the first and second portions extend through the two slots along respective imaginary lines that meet in the shaft at an angle of about 60° to about 120°.

* * * * *